(12) United States Patent
Cawthra et al.

(10) Patent No.: US 6,491,999 B1
(45) Date of Patent: Dec. 10, 2002

(54) CABLED COVERING PART, A METHOD FOR MANUFACTURING SUCH AND MEANS THEREFOR

(75) Inventors: Christopher Cawthra, Bradford (GB); Wolfgang Diegmann, Wuppertal (DE); Peter Ehrler, Reinheim (DE); Norbert Hinz, Wuppertal (DE); Joseph J. Laux, Ermatingen (CH); Robert Hermanus van Ligten, Zürich (CH)

(73) Assignees: Rieter Automotive (International) AG, Zollikon (CH); Delphi Automotive Systems Deutschland GmbH, Wuppertal (DE)

( * ) Notice: Subject to any disclaimer, the term of this patent is extended or adjusted under 35 U.S.C. 154(b) by 0 days.

(21) Appl. No.: 09/275,387

(22) Filed: Mar. 24, 1999

(30) Foreign Application Priority Data

Mar. 26, 1998 (CH) .............................. 0718/98

(51) Int. Cl.⁷ ........................ B65D 85/00; B65D 25/20
(52) U.S. Cl. ................... 428/95; 428/36.1; 428/36.5; 296/97.23; 206/482; 206/702
(58) Field of Search ............... 428/36.1, 36.5, 428/95; 296/97.23; 206/702, 477, 482; 15/215–217

(56) References Cited

U.S. PATENT DOCUMENTS

| | | | | |
|---|---|---|---|---|
| 3,576,304 A | * | 4/1971 | Gillemot et al. | 248/54 |
| 3,630,564 A | * | 12/1971 | Ferrara | 296/1 |
| 3,984,621 A | * | 10/1976 | Propst | 174/48 |
| 4,737,764 A | * | 4/1988 | Harrison | 340/114 |
| 5,082,712 A | * | 1/1992 | Starp | 428/95 |
| 5,439,725 A | * | 8/1995 | Roberts | 428/95 |
| 5,489,458 A | * | 2/1996 | Sato et al. | 428/137 |
| 5,877,451 A | * | 3/1999 | Zimmerman | 174/68.3 |
| 5,965,951 A | * | 10/1999 | Moore et al. | 307/10.1 |

OTHER PUBLICATIONS

Rudin, Alfred. The Elements of Polymer Science and Engineering. Academic Press, Inc. 1982. pp. 24–25.*

* cited by examiner

Primary Examiner—Elizabeth M. Cole
Assistant Examiner—Jenna-Leigh Befumo
(74) Attorney, Agent, or Firm—Nath & Associates PLLC; Gary M. Nath; Marvin C. Berkowitz

(57) ABSTRACT

The invention relates to a covering part with cable channels and a cabled covering part such as a carpet for vehicles, which is provided with several self-closing channels acommodating a cable network. These channels can be formed directly into the spring-elastic part of the covering or can comprise a plastic or foam rubber sleeve slotted on their longitudinal side and lying in the covering part. The inexpensive and simple to manufacture covering part permits an exact leading of the cables, a good protection for the cable network and a simple and quick application and exchange of the cables. The invention further relates to a method for manufacturing such a covering part.

18 Claims, 3 Drawing Sheets

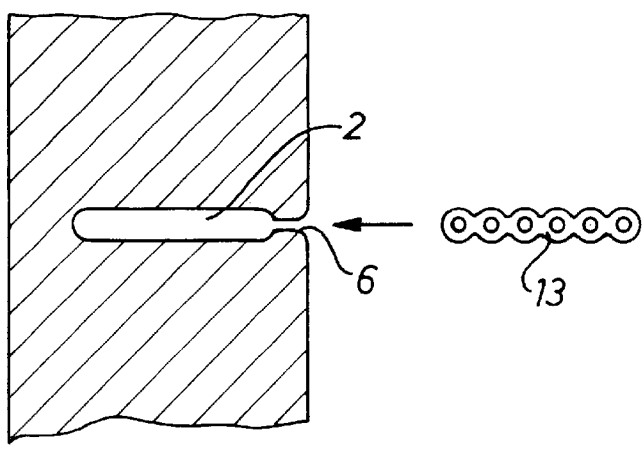
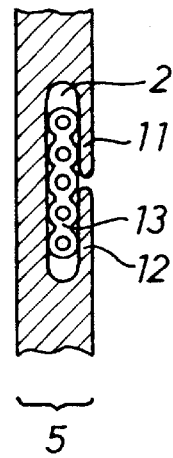
Fig. 4a
Fig. 4b
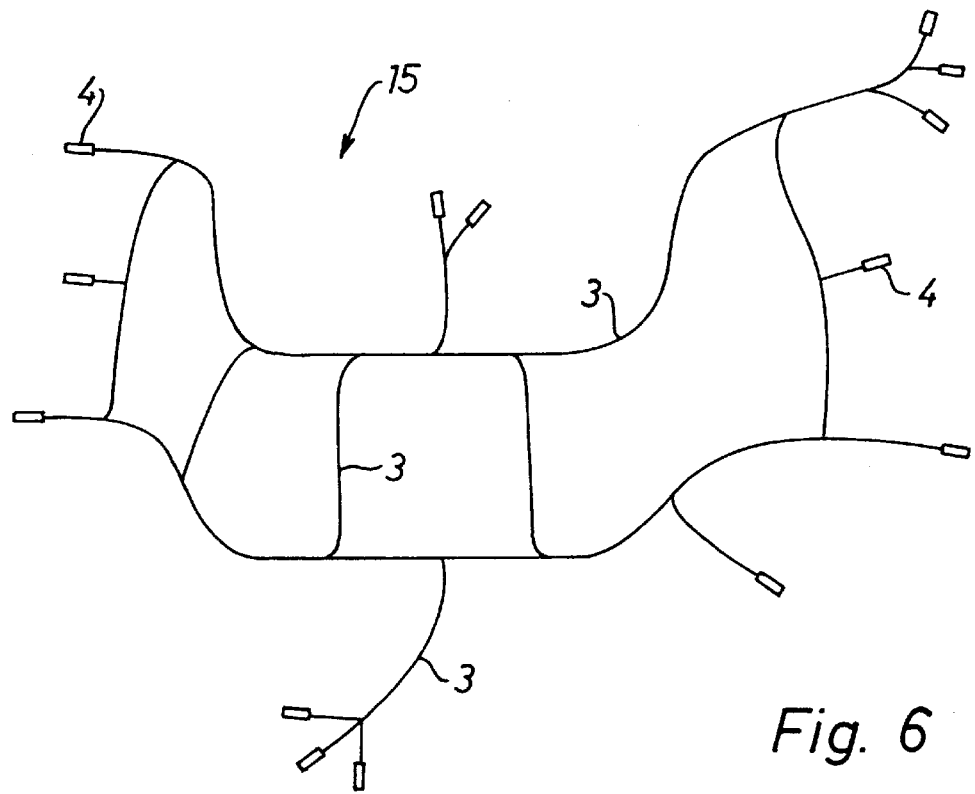
Fig. 6

CABLED COVERING PART, A METHOD FOR MANUFACTURING SUCH AND MEANS THEREFOR

FIELD OF THE INVENTION

The present invention relates to a cabled covering part for vehicles, to a method for manufacturing such a covering part, as well as to a cable group suitable for manufacturing this covering part and a covering part capable of being cabled.

BACKGROUND OF THE INVENTION

Vehicle coverings, in particular vehicle carpets, in which there are integrated the electrical leads required for the operation of the vehicle, are known from literature, but however still today have not prevailed in practice. Thus the required cables are as a rule manually bundled into a cable loom and provided with the necessary connectors. These cable looms are loosely applied into the vehicles independently of the coverings, i.e. only fastened in a makeshift manner. As a rule this leads to the fact that with the completed vehicles, the cables layed more or less loosely prevent a good fitting accuracy of the carpet. Furthermore it is necessary to protect the loosely layed cables from damage or rapid wearing, i.e. loadings causing material fatigue, with plastic sleeves or likewise. The assembly of such cable looms requires several working procedures in which the cable loom is first rolled out and roughly positioned and subsequently the layed cable loom is fastened with the help of adhesive tape before the vehicle carpet may be assembled. The assembly has shown to be difficult since the individual cable ends may not be manipulated in a simple manner. Often the cables or connectors are damaged on assembly of the carpet.

For this reason in IT 01274694 it has already been suggested to lay the cables into a cable channel provided in the covering part. These cable channels are closed with a material strip and secured with a further cover layer. It has however been shown that with the deformation of these covering parts as is necessary with vehicle carpets, the fitting accuracy between the cable channels and the covering material strips is lost, i.e. the cable channels may no longer be correctly closed. Furthermore a multitude of additional working procedures are required in that the covering part on one side must be provided with cable channels and additional material strips must be manufactured with an exact fitting in order to be able to close these cable channels. Furthermore an additional cover layer must be deposited in order to secure these material strips at the location of the cable channels. Thus the suggested arrangement has proven to be difficult in manufacture and in handling.

In another embodiment form the cables are directly foamed into the covering part. With this the cables may be better protected. It has however been proved that with the direct foaming-in of the cables, whose insulation material and the foam are not compatible with one another, the compatibility must be achieved by additional measures requiring expense. Furthermore the cables once foamed in may no longer be exchanged, i.e. render more expensive any occurring repair work given short circuits and cable breakage. Likewise defects or damaged carpets may not be exchanged in a simple manner, i.e. the whole cabling must be exchanged at the same time. Moreover the foaming and the forming and cutting of covering parts with cables cannot be accomplished in a simple manner, since a multidue of cable ends must be led out from the tools used for the foaming, deformation and the cutting.

SUMMARY OF THE INVENTION

It is therefore the object of the present invention to provide a cabled covering part which can be manufactured simply and inexpensively and also given a heavy deformation of the covering parts permits an exact leading of the cables and a simple and quick application and exchange of the well protected cables. Also there are to be provided a covering part capable of being cabled and means which allow the manufacture of this cabled covering part in a simple manner.

According to the invention this object is achieved by a covering part which is provided with several, self-closing cable channels accommodating a cable network. Such self-closing cable channels in a first embodiment form are formed directly into the spring-elastic part of the covering part. As a rule covering parts for vehicles and in particular carpets comprise a spring elastic underlayer and a decor layer. Preferably the cable channels according to the invention lie in the spring-elastic underlayer. According to the construction of the covering part this spring-elastic underlayer may be manufactured from a plastic foam or a fibre-fleece.

The shaping of the cable channels according to the invention is advantageously adapted to the shape of the cables to be applied and their specific application. Thus for ribbon cables flat cavities, or for cable bunches, cavities with a round cross section may be formed directly into the spring-elastic underlayer.

In a further formation of the cable channel according to the invention this may consist of a plastic or foam rubber sleeve slotted on the longitudinal side, which lies in the covering part. This embodiment form lends itself particularly to where the covering part, e.g. door covering, is not sufficiently spring-elastic.

With such covering parts the cabling may be carried out exactly on the spot. At the same time the cable network as well as the spring-elastic covering inlays may be manufactured in a simple manner in the manufacturing workshops already existing today. For applying the cable network into the self-closing channels, in the case of a vehicle carpet, the spring-elastic part with the self-closing cable channels may be set up in an A-shape. The use of premanufactured cable system permits the correct allocation of the cable ends without further checking. At the same time the individual cables may be layed through the covering part via the shortest possible path or via the path particularly adapted to the special shaping.

Preferably the cable network to be layed is applied on the rear side of the covering part. It is however to be understood that the cable channels arranged in the underlayer may be provided with the required cables, before this underlayer is provided with a decor or carpet layer.

The covering parts according to the invention find their application first and foremost as cabled vehicle carpets, but they may also be used with door coverings, roof skies etc., i.e. anywhere where cables and coverings are advantageously to be incorporated together and the cables in the vehicle must be led in a protected and exchangeable manner.

Further advantageous further formations of the covering part according to the invention and the means for manufacturing these covering parts are defined in the respective dependent claims.

The advantages of the covering part manufactured according to the invention can be directly seen by the man skilled in the art. In particular by the use of a loosely bundled cable system instead of the usually used rigidly bundled cable looms considerable material costs may be saved, since for the preassembly of the cable systems shorter cables and less adhesive tape are required. The covering part according to the invention further renders the particular plastic parts for the protection of the cable bundle superfluous. The use of cable networks instead of cable looms moreover leads to the fact that the cabling is not perceived by the vehicle occupants as a disturbing bulge and a precise laying of the carpets becomes possible. A further considerable cost saving has shown to be the time saving with the manufacture of the vehicles or with the assembly of the electric cables and carpets.

BRIEF DESCRIPTION OF THE DRAWINGS

In the following the invention is to be explained in more detail by way of embodiment examples and with the help of the figures. With this there are shown:

FIG. 4a a third embodiment form of a self-closing cable channel for a ribbon cable;

FIG. 4b a fourth embodiment form of a self-closing cable channel for a ribbon cable;

FIG. 6 a schematic view of a cable system.

DETAILED DESCRIPTION

Figure 1:
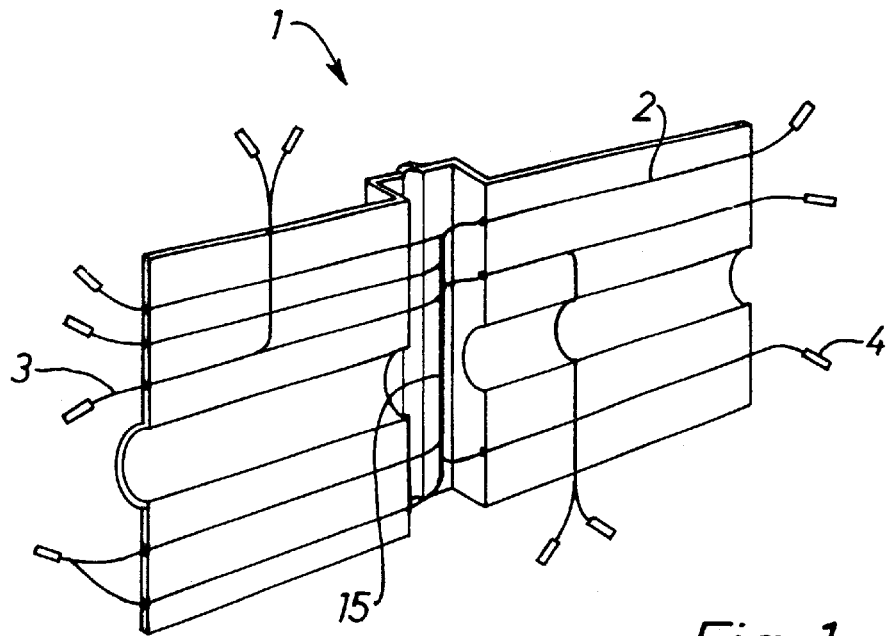
FIG. 1 a schematic representation of a cabled covering part according to the invention.

FIG. 1 schematically shows a covering part 1 suitable as a vehicle carpet, with cable channels 2 according to the invention. These cable channels 2 are accessible from the underside of the carpet. For laying the cables and/or cable groups 3 of a cable network 15 according to the invention, this covering part may be folded into an A-shape. This permits the individual cables and/or cable groups 3, in a simple manner, at best even in an automated manner, to be layed into the self-closing cable channels 2. Preferably the individual cables and/or cable groups 3 are already cut to the desired length and provided with suitable connectors 4. According to the invention the cables and/or cable groups 3 are partially bundled and have the shape of a cable network which in the desired arrangement may be applied into the covering part 1. The cable channels 2 according to the invention may, independently of the shaping of the covering part 1, be led in this part in any manner and also cross over.

Figure 2:
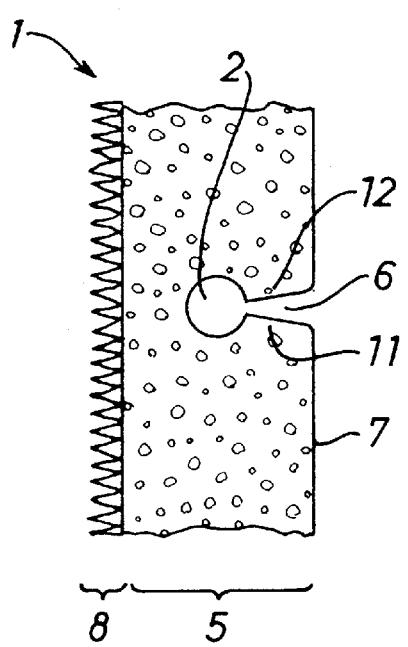
FIG. 2 a first embodiment form of a self-closing cable channel.

FIG. 2 shows an advantageous shaping of the cable channel 2 according to the invention. This is directly formed into the underlayer 5 of the covering part 1. With this lips 11, 12 of the self-closing cable channel 2 form a slot 6 which faces the rear side 7 of the covering part 1 provided with a decor layer 8. This slot 6 runs into the cavity of the cable channel 2 in a funnel-like manner. This shaping simplifies the introduction of the cable into the cable channel. On introduction of such a cable the spring-elastic underlayer 5 is locally pressed apart and, after incorporating the cable, springs back into its original shape, i.e. closes the gap opening. Preferably this spring-elastic underlayer consists of a foam.

Figure 3:
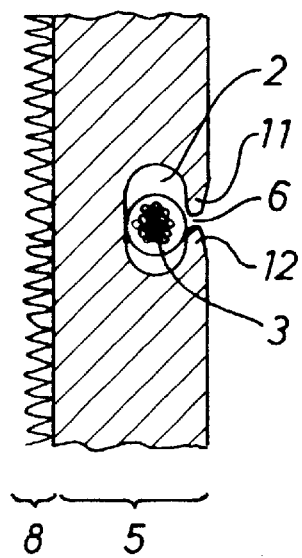
FIG. 3 a second embodiment form of a self-closing cable channel with a braided cable.

FIG. 3 shows another formation of the cable channel 2 according to the invention. This comprises essentially two spring-elastic lips 11 and 12 lying opposite one another, between which a self-closing slot 6 is formed. Again the cable channel 2 is directly formed into the spring-elastic underlayer 5 and comprises the slot 6 to the rear side of the covering part 1 provided with a decor layer 8. With this formation the slot 6 is arranged asymmetrically to the cavity of the cable channel 2. With this the underlayer 5 may be manufactured just as well from a fibre layer as from a foam layer. On introducing a braided cable 3 into the cable channel 2 the spring-elastic lips 11, 12 abutting one another are pressed inwardly and subsequently spring back again into their original position.

FIGS. 4a and 4b show a cable channel 2, whose cross section is adapted to the shape of a ribbon cable 13. With this it is clear that the use of ribbon cables 13 is particularly suitable for the manufacture of covering parts which are as thin as possible. With this FIG. 4b again shows an embodiment form with spring-elastic lips 11, 12 whilst with the embodiment form in FIG. 4a the slot 6 is formed by spring-elastic shoulders.

Figure 5:
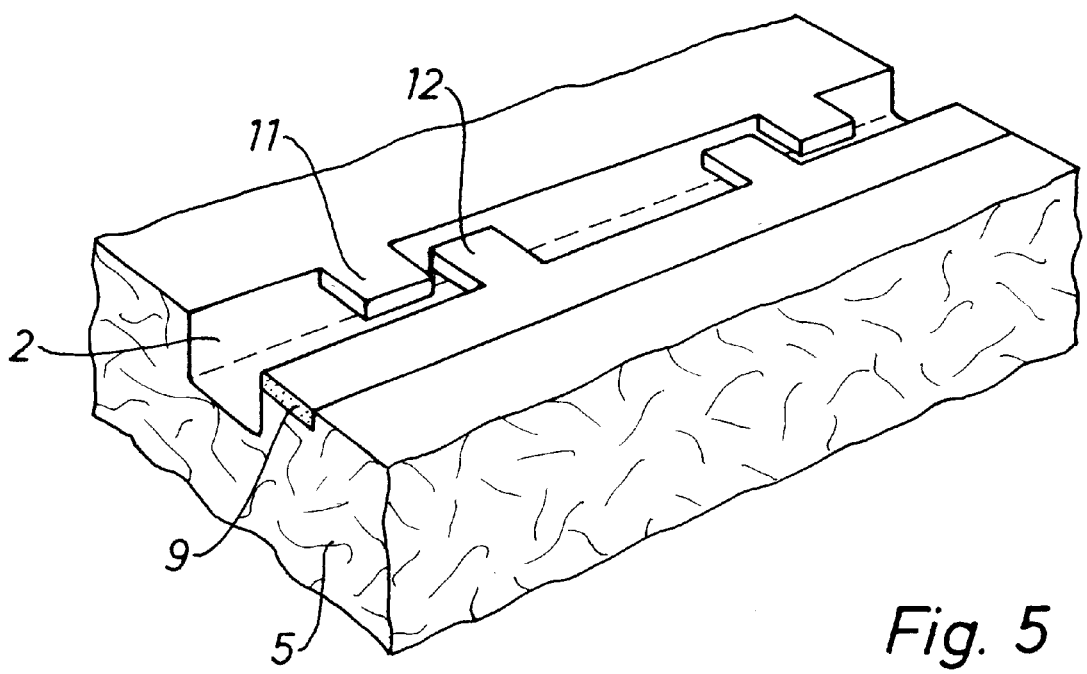
FIG. 5 a view of a self-closing cable channel with lip pairs.

FIG. 5 shows a further embodiment form of the self-closing cable channel 2 with spring-elastic lips 11, 12 arranged neighbouring one another. These lips 11 may be part of the spring elastic material 5 of the covering part or may be manufactured from another spring-elastic material 9. It is to be understood that the man skilled in the art would select suitable materials and manufacturing ways without being inventive.

FIG. 6 shows a cable network 15, as is suitable for the manufacture of a cable covering part. In contrast to conventional cable looms, which consist of a thick rope of bundled cables, this cable network comprises several branching or unifying cables and/or cable groups, which in the desired manner can be distributed over the whole area of the covering part. The term cable network used here is to be understood as a cable arrangement which consists of several net-like, i.e., flatly distributed cable groups. In particular this cable network is designed such that for example no cable comes to lie in the foot region of the vehicle carpet and the individual cable groups may be preferably layed in the edge regions of the vehicle carpet. By way of the distribution of the cables, bundled in the conventional cable looms, into cable groups in the present cable network, the size of the individual cable channels may be considerably reduced and thus these cables of the cable network no longer have an annoying effect.

The advantages of a covering part with cable channel according to the invention are directly evident to the man skilled in the art and are particularly to be seen in the simplified (and thus economic) cabling. Moreover the covering parts with the cable channels according to the invention may be manufactured in a simple manner, i.e. require no special tools for the rear foaming or require no additional material and decor layer for closing the cable channel. The possibility of the leading of the cable channels in any possible shaping has been shown to be particularly advantageous, in particular a crosswise leading of the cables. This permits the required cable paths to be formed as short as possible and thus cable material to be saved.

A considerable advantage of the cabled covering part according to the invention is the time saving, the handling and the precise positioning thereof on manufacture of the vehicles.

Further formations of the cable channel according to the invention lie withing the scope of the ability of the man skilled in the art. In particular the shaping of the self-closing slot may be adapted to the shape of the cable to be applied.

What is claimed is:

1. A cabled covering part for vehicles comprising:
   a cable covering substrate having at least one layer of a spring-elastic material;
   a network of a plurality of cable channels disposed in said spring-elastic material;
   a longitudinal opening disposed on a side of each of said plurality of cable channels, each said opening being in communication with an interior space of a corresponding one of said plurality of cable channels;
   at least one self-closing lip disposed on said longitudinal opening that can close said longitudinal opening in a spring-elastic manner.

2. A cabled covering part according to claim 1, wherein the cable network is partially bundled.

3. A cabled covering part according to claim 1, wherein the network of cable channels are formed directly into the spring-elastic material of the covering part.

4. A cabled covering part according to claim 1, wherein the at least one lip comprises the same spring-elastic material as the covering part.

5. A cabled covering part according to claim 1, wherein said at least one lip extends over a whole length of the longitudinal opening of said cable channel.

6. A cabled covering part according to claim 1, wherein the spring-elastic material of the covering part or of the at least one lip comprise foam.

7. A cabled covering part according to claim 1, wherein the spring-elastic material of the covering part or of the at least one lip comprise fibre fleece.

8. A cabled covering part according to claim 1, further comprising a cable group preassembled in the form of a cable network disposed in a portion of said network of a plurality of cable channels.

9. A cabled covering part according to claim 8, wherein the cable network is partially bundled.

10. A covering part capable of being cabled comprising:
    a cable covering substrate having at least one layer of a spring-elastic material;
    a network of a plurality of cable channels disposed in said spring-elastic layer;
    a self-closing longitudinal opening disposed on a side of each of said plurality of cable channels, each said opening being in communication with an interior space of a corresponding one of said plurality of cable channels.

11. A covering part according to claim 10, wherein the longitudinal opening is at least partially provided with at least one lip that can close in a spring-like manner.

12. A covering part according to claim 11, wherein the network of cable channels and the at least one lip are directly formed into the spring-like material of the covering part.

13. A covering part according to claim 11, wherein the at least one lip comprises a material other than the spring-elastic material of the covering part.

14. A covering part according to claim 11, wherein said at least one lip extends over a whole length of the longitudinal opening of said cable channel.

15. A covering part according to claim 11, wherein the spring-elastic material of the covering part or of the at least one lip comprise foam .

16. A covering part according to claim 11, wherein the spring-elastic material of the covering part or of the at least one lip comprise fibre-fleece.

17. A cabled covering part according to claim 1 wherein said spring-elastic material is selected from the group consisting of a foam and a fibre-fleece.

18. A method for enclosing a cable in a covering part comprising:
    preassembling a cable group in the form of a cable network;
    providing a covering part having at least one layer of a spring-elastic material having a network of a plurality of cable channels disposed therein, each of said cable channels having a self-closing longitudinal opening whereby a corresponding interior space of each of said cable channels can be accessed;
    arranging the cable network to correspond to a selected portion of the network of cable channels;
    installing a portion of the cable network through the self-closing longitudinal opening of the selected portion of the network of cable channels into a corresponding portion of the interior spaces of said network of cable channels.

* * * * *